(12) United States Patent
Smiley

(10) Patent No.: US 6,367,405 B1
(45) Date of Patent: Apr. 9, 2002

(54) FOLDING BOAT

(76) Inventor: Gregory W. Smiley, 461 Main St., Etna, NY (US) 13062

( * ) Notice: Subject to any disclaimer, the term of this patent is extended or adjusted under 35 U.S.C. 154(b) by 0 days.

(21) Appl. No.: 09/797,384

(22) Filed: Mar. 1, 2001

(51) Int. Cl.[7] ................................................ B63B 7/00
(52) U.S. Cl. ...................................... 114/353; 114/347
(58) Field of Search ................................ 114/347, 352, 114/353, 354

(56) References Cited

U.S. PATENT DOCUMENTS

| | | | |
|---|---|---|---|
| 4,274,170 A | 6/1981 | Simpson | 9/1.4 |
| 4,574,725 A | 3/1986 | Dowd | 114/352 |
| 4,702,193 A | 10/1987 | Jones et al. | 114/354 |
| 4,706,597 A | 11/1987 | Figone | 114/353 |
| 4,751,889 A | 6/1988 | Pool | 114/39.1 |
| 4,821,666 A | 4/1989 | Ingam | 114/347 |
| 4,841,899 A | 6/1989 | Fleckles et al. | 114/347 |
| 4,911,095 A | 3/1990 | Kaye | 114/354 |
| 5,615,634 A | 4/1997 | Gonda | 114/354 |
| 5,680,828 A | 10/1997 | Totten | 114/347 |
| 5,875,731 A | 3/1999 | Abernethy et al. | 114/354 |
| 5,964,178 A | 10/1999 | Gonda | 114/354 |
| 6,006,691 A | 12/1999 | Wilce | 114/353 |
| 6,065,421 A | 5/2000 | Haller et al. | 114/347 |

OTHER PUBLICATIONS

"Anatomy of a Folbot"; http://www.folbot.com/anatomy.htm; 2 pages.

Primary Examiner—Jesus D. Sotelo
(74) Attorney, Agent, or Firm—Brown & Michaels, PC

(57) ABSTRACT

A boat comprising a folding internal frame and a flexible outer skin. When not in use, the boat folds in half to a compact flat shape beneficial for shipment, storage and transport. The integrated tubular frame/floor pan is hinged to "pop up" or collapse quickly without the need for separate tools. The outer skin stays on the boat even when it transitions to the folded configuration. Latch mechanisms hold the frame rigid in the open position.

8 Claims, 9 Drawing Sheets

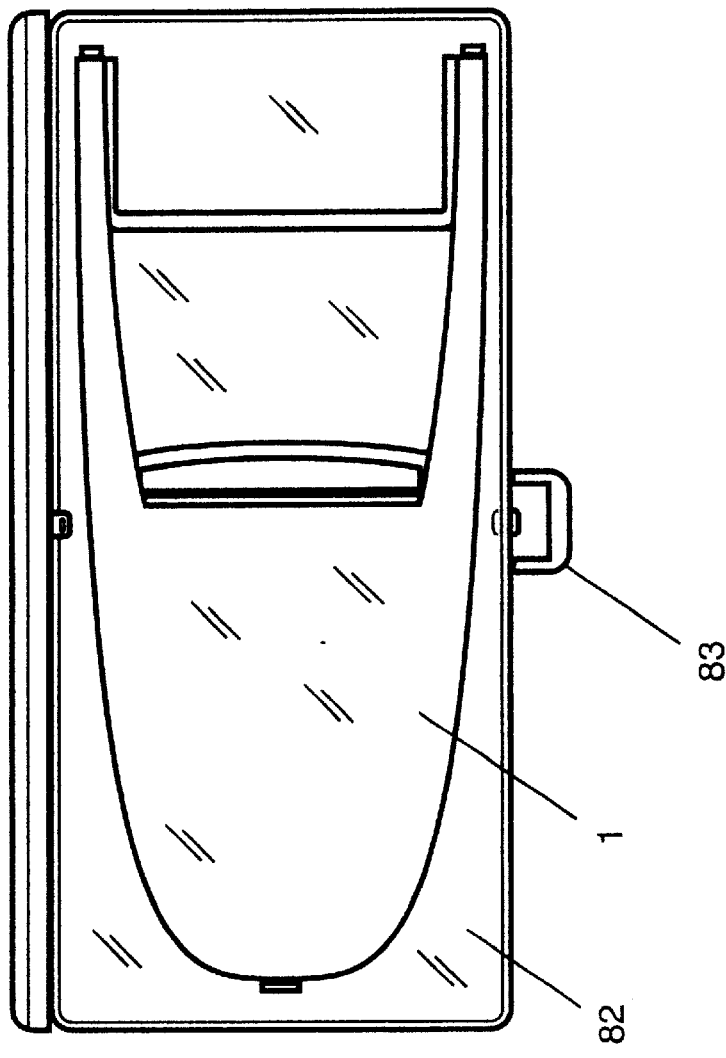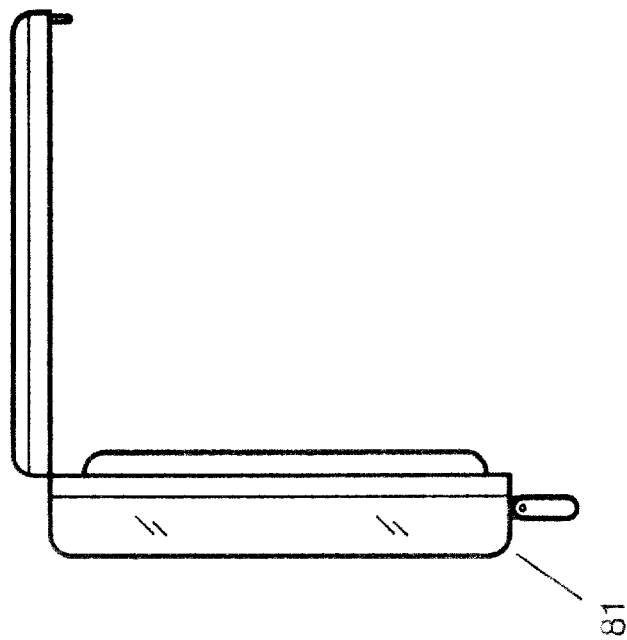
Fig. 8B
Fig. 8A

FOLDING BOAT

BACKGROUND OF THE INVENTION

1. Field of the Invention

The invention pertains to collapsible boats. More particularly, the invention pertains to folding boats such as kayaks and canoes that can be quickly set up, quickly broken down, and easily folded flat for storage, transport or shipping.

2. Description of the Related Art

Although high-performance, lightweight personal watercraft are generally well designed for use in water, they are often difficult to transport by vehicle, particularly due to their length. Accordingly, there is a need for watercraft that can be disassembled for transport in small packages and reassembled for use in water.

Collapsible skin-on-frame kayaks, inflatables, and other boats are known in the art. The simplest such boats are inflatable; these rely upon pneumatic tubes to create buoyancy and provide rigidity and shape. Most inflatable boats are typically low performance craft, however, due to the shape limitations imposed by pneumatic tubes.

Another class of collapsible watercraft is the folding boat, which is generally comprised of multiple individual pieces to form an internal frame over which a removable flexible outer skin is stretched taut. The outer skin is typically made from a durable waterproof fabric. When disassembled, the parts are intended to fit in a compact bag. Though portable, this type of boat can take up to 20 minutes or more to assemble, and frame rigidity is a challenge.

See, for example, the collapsible boats disclosed in U.S. Pat. No. 6,065,421 (Haller et al., 2000), U.S. Pat. No. 6,006,691 (Wilce, 1999), U.S. Pat. No. 5,964,178 (Gonda, 1999), U.S. Pat. No. 5,875,731 (Abernathy et al., 1999), U.S. Pat. No. 5,680,828 (Totten, 1997), U.S. Pat. No. 5,615,634 (Gonda, 1997), U.S. Pat. No. 4,911,095 (Kaye, 1990), U.S. Pat. No. 4,841,899 (Fleckles et al., 1989), U.S. Pat. No. 4,821,666 (Ingram, 1989), U.S. Pat. No. 4,751,889 (Pool, 1988), U.S. Pat. No. 4,706,597 (Figone, 1986), U.S. Pat. No. 4,702,193 (Jones et al., 1987), U.S. Pat. No. 4,574,725 (Dowd, 1986), and U.S. Pat. No. 4,274,170 (Simpson, 1981). For example, the frame of the boat disclosed in the above-referenced Fleckles patent (U.S. Pat. No. 4,841,899) is composed of a plurality of short, separable pieces that must all be attached or hooked together, or pieces of the main frame must be inserted into the hull, before the frame is ready for covering by a skin.

Accordingly, it is desirable to provide a rigid-feeling, good-handling boat that also has the ability to quickly convert between flat storage and use modes. Preferably such conversion would take place by quickly "popping up" from the folded mode to the use mode. Flat storage is beneficial for areas where transportation or storage space is limited, such as on board sailing vessels, in apartments, inside automobile trunks, or on bicycle carts. Flat storage also reduces shipping costs.

SUMMARY OF THE INVENTION

The boat of the invention comprises a folding internal frame and a flexible outer skin. When not in use, the boat folds in half to a compact shape beneficial for shipment, storage and transport. In alternate embodiments, the boat folds in other fractions such as thirds or quarters, instead of in half.

BRIEF DESCRIPTION OF THE DRAWINGS

FIG. 8 shows plan and side views of a hard travel case suitable for shipment, including air shipment, of the invented boat.

DETAILED DESCRIPTION OF THE INVENTION

Figure 1:
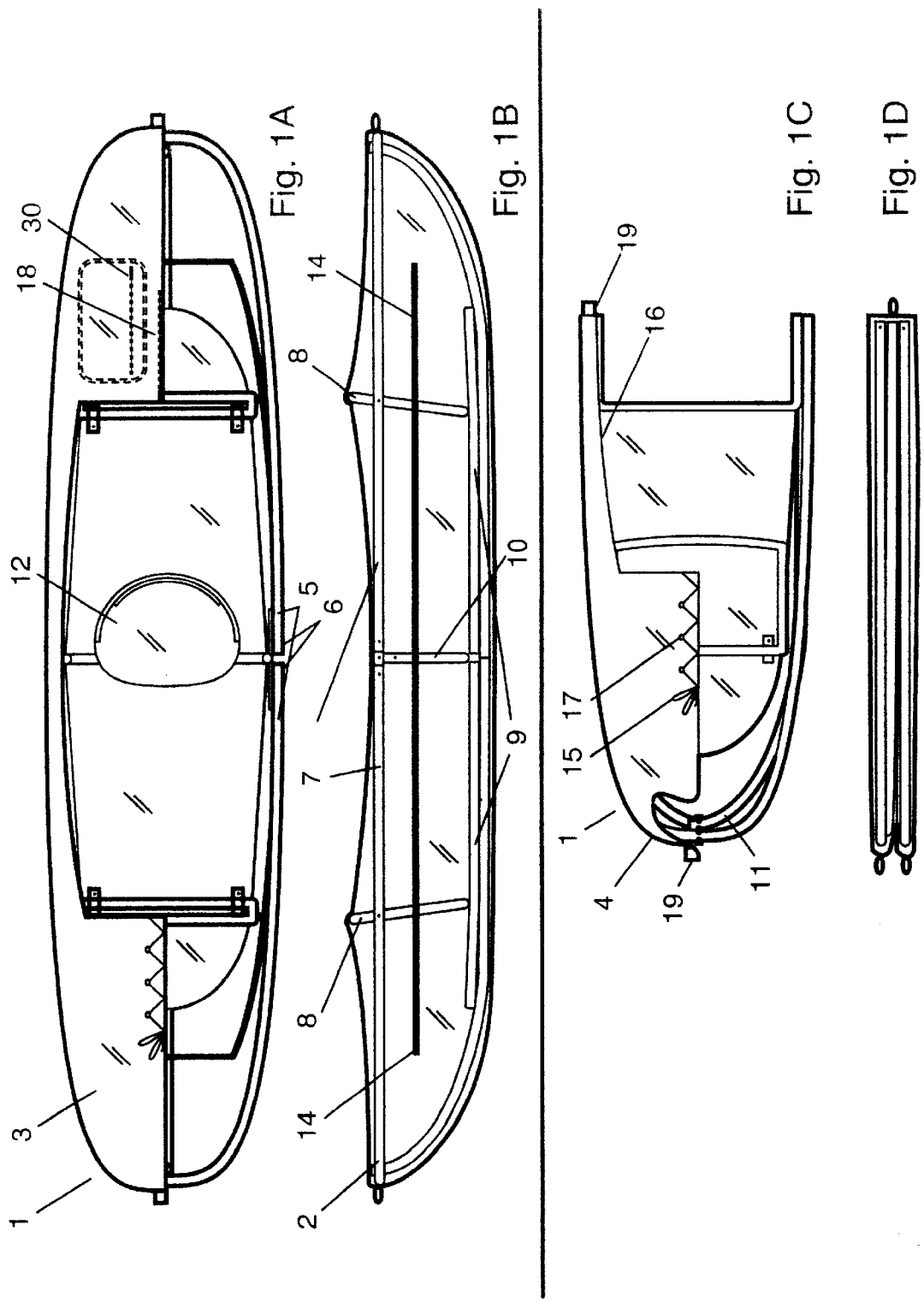
FIG. 1A shows plan and side views of the invented boat in the open position.
FIG. 1B shows plan and side views of the invented boat in the folded position.
Figure 2:
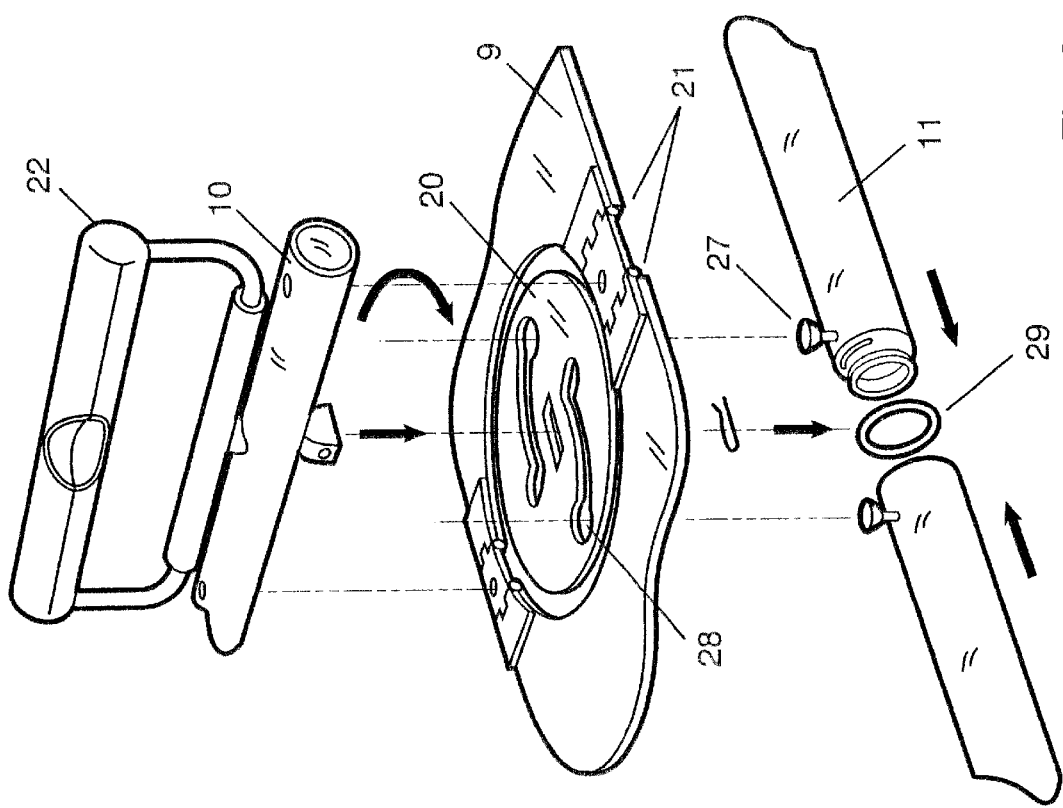
FIG. 2 is an exploded perspective view of the keel tube interlock assembly of the invented boat.
Figure 3:
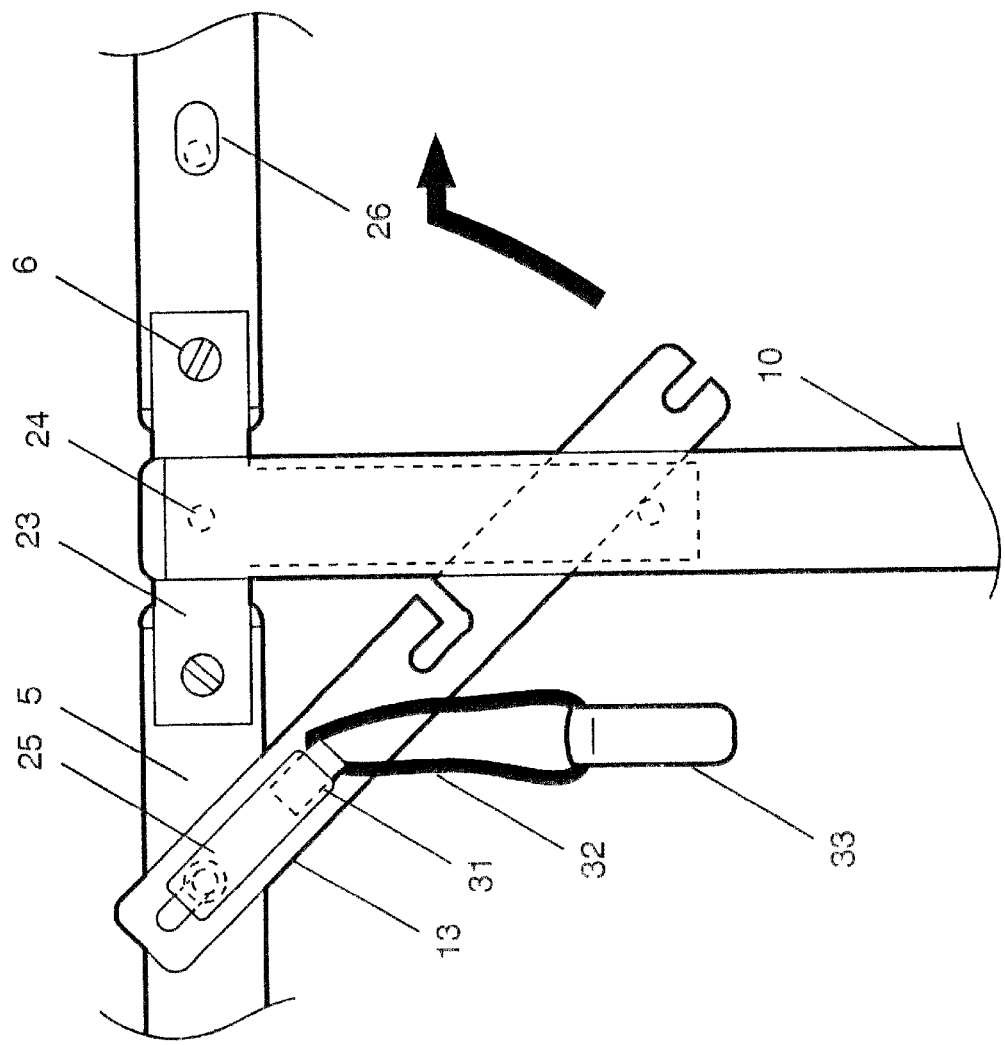
FIG. 3 illustrates the intersection of the primary arcs and central cross rib, a T-brace, and a three-point cross brace as viewed from the center of the boat looking outward.

Referring to FIGS. 1A, 1B, 2 and 3, the invented boat (1) comprises a folding internal frame (2) and a flexible outer skin (3). The internal frame (2) comprises two C-shaped arcs (5) connected to central pivots (6) to create the primary frame (7), which runs along the outer edge to form the top profile of the boat (1). The primary frame (7) is preferably centrally located, especially in the kayak embodiment. In the canoe embodiment, however, the primary frame (7) is biased toward the top. The frame (2) is preferably constructed from round aluminum tubing; alternately, it can be constructed from other substances such as wood or steel, with various profiles such as bar stock or rectangular tube.

The internal frame (2) also comprises internal, peripheral cross ribs (8) and a central cross rib (10). The peripheral cross ribs (8) pivot to transition between the folded configuration (FIG. 1B) and the unfolded, rigid three-dimensional frame (FIG. 1A). In the unfolded position, the cross ribs (8, 10) are at or near right angles to the primary frame (7) for maximum strength. At least one peripheral cross rib (8) on each C-shaped arc (5) pivots downward towards the center of the boat and up towards each end of the boat. A two-piece boat floor (9) is connected to each peripheral cross rib (8) and the central cross rib (10). Unfolding the boat moves the peripheral cross ribs (8) into position. One or more, preferably two, keel sections (11) are attached to the primary frame (7) at one end and snap into a plate (20) on the central cross rib (10) on the other end to form trusses. The attached ends of the keel sections pivot laterally on pins. In an alternate embodiment, keel sections (11) are separate bolt-on pieces that are bolted in place to the main frame (7) and cross ribs (8), with no pivots.

A seat (12) is attached, slides, or flips into position. Preferably, the seat (12) is attached along the front edge to a fabric hinge that enables the seat (12) (with Velcro loops) to flip 180 degrees into position and attach to Velcro hooks located on both halves of the boat floor (9). The reinforced fabric seat back (56 of FIG. 5) has truss straps on either side to support the operator. This is described below in reference to FIG. 5.

The configuration allows the skin (3) to remain around the frame in the folded and unfolded positions. Preferably, additional longitudinal rods (14) are attached or pivot in place on the central cross rib to help maintain the boat shape in the water. Once unfolded, a cord (15) is tightened around the top opening (16) and/or laced (17) to pull the skin taut around the frame. A zipper (18) can also be incorporated to help facilitate easy removal of the skin (3) from the frame (2). Fabric loop tie-downs (19) are attached to the outer skin (3) and can also be tied to the frame (2). Zipper pockets (30) are optionally incorporated on the top surfaces of the skin (3).

On either end of the central cross rib (10) there is mounted a T-brace (23). The T-brace (23) comprises a central post (24) and two central pivots (6). A post (25) on each of the primary arcs (5) is connected to a slotted, three-point cross brace (13) to secure the frame (2) in position for use. The cross brace (13) is attached to a post (25) and swings into position to engage two other posts (24, 26). In an alternate embodiment, a fully removable brace is used. A capped tab (31) accepts a flexible strap (32) with a pull tab (33). The tab is stretched over and latched to a post (26) on the opposite side to hold the brace in position.

Posts (27) on the inboard ends of each keel section (11) snap in a keel lock plate (20) on the central cross rib, and interlock male and female ends of the keel sections (11) when the slotted plate (20) is rotated. The plate (20) is in line with dual hinges (21) and the boat floor (9). The dual hinges (21) also mount to the central cross rib (10). A handle (22) passes through the bottom of the central cross rib (10) and is attached to the keel lock plate (20). The central cross rib bolts to the center portion of the dual hinges which, in turn, are bolted to the floor (9). The central cross rib (10) sits above the floor (9) by the thickness of the hinge plate (20), which is preferably approximately one eighth of an inch. The handle (22) pivots down and is preferably positioned under the movable seat; alternatively, the handle (22) can be made integral to the movable seat.

Spiral slots (28) in the plate provide a cam action that first draws the posts together then backs off to hold them in the locked position when the operator rotates the handle (22) clockwise. An O-ring (29), preferably, or spring, mounted between the male and female ends of the keel sections provides resistance to hold the pins in the locked position. When folding the boat, the handle (22) is rotated counter-clockwise out of the locked position, the posts (27) are detached from the keel lock plate (20), and each keel section (11) is rotated laterally toward the C-shaped arcs (5) (one pivots to the starboard side, the other to the port side).

The skin (3) is made of a water-resistant or waterproof material, such as neoprene, Hypalon, Cordura, plastic coated fabric, rubberized fabric or various materials known to those skilled in the art, sandwiched together for strength, rigidity and waterproof characteristics. In the preferred embodiment, the skin is made of urethane-coated ballistic nylon.

Figure 4:
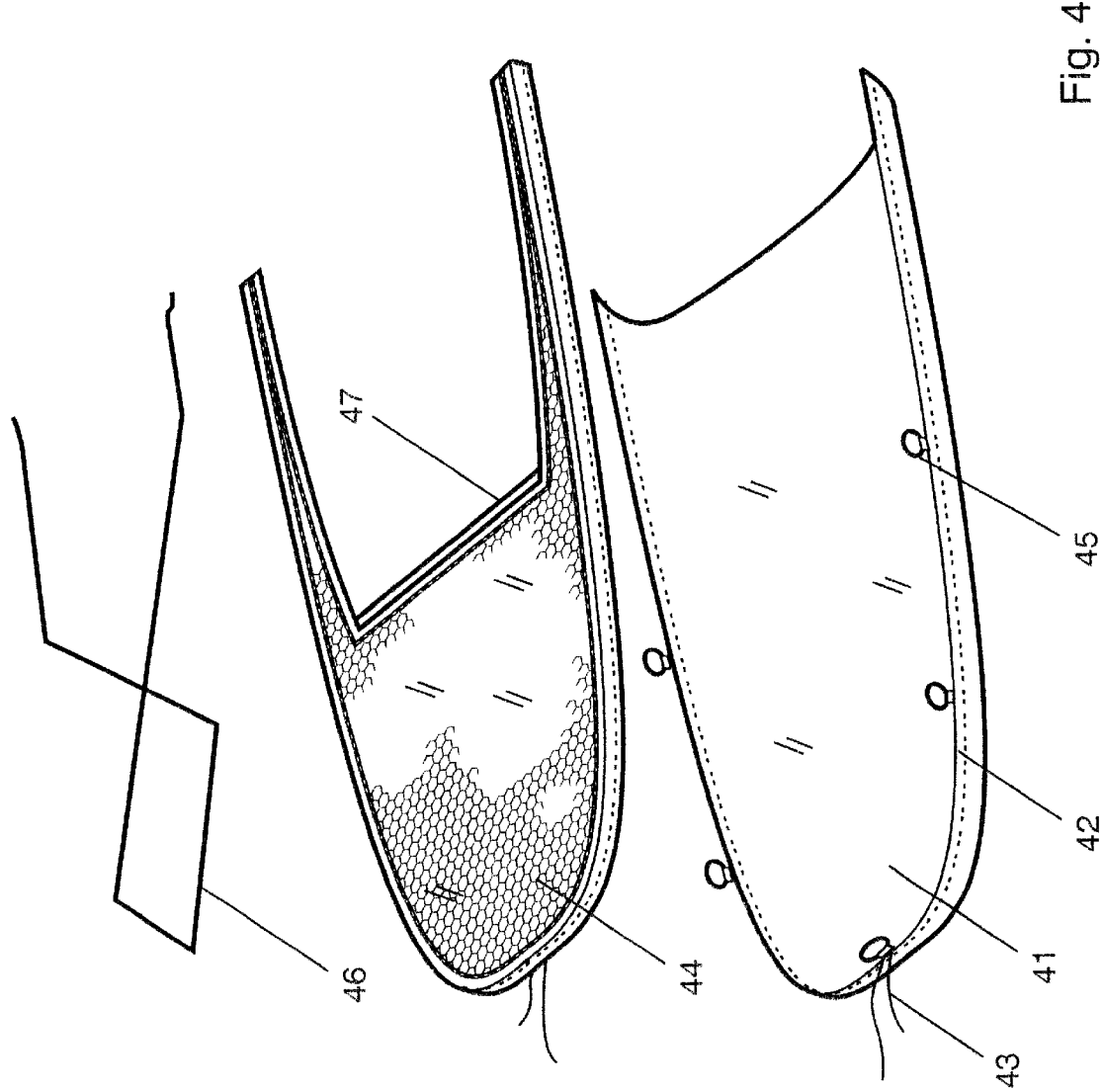
FIG. 4 shows lower and upper sections of an embodiment of the skin of the invented boat, the upper section including an open mesh.

Although not the preferred mode, the skin can consist of a top cap over the primary frame and a bottom cap overlapping the primary frame and a portion of the top cap. Referring to FIG. 4, in such embodiment cords are used like shoelaces over the top of the boat to hold the two halves together and tighten the bottom cap over the frame. The lower section of the skin (41) includes a hemmed lip (42) containing a draw string (43) for securing the skin around the kayak frame. The upper section with an open fabric mesh (44) laps the lower section and is secured in a similar manner with a draw string. Loops (45) are provided to lace an additional cord (46) over the upper section (44) for added security. A 'C' channel (47) on the upper section latches over the peripheral cross rib.

Figure 5A:
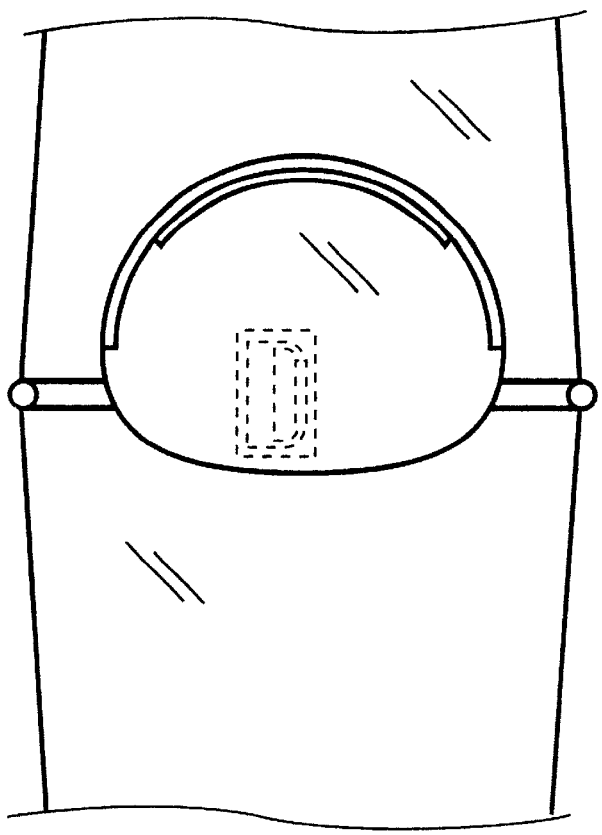
FIG. 5 shows plan and cross-sectional views of a boat seat according to the present invention.
Figure 5B:
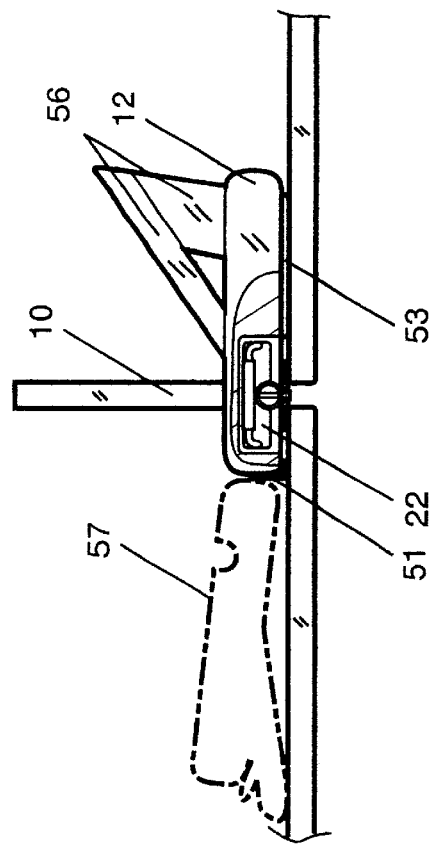

Referring to FIG. 5, plan and cross-sectional views of a boat seat according to the present invention are provided. A fabric strap hinge (51) is attached along the middle of the front edge of the seat (12) and Velcro hook and loop (53) is used under the back surface of the seat to secure the seat to the base of the kayak. A recess on the under side of the seat encases a folded handle (22) and the central cross rib (10). A fabric seat back (56) folds flat allowing the seat to flip over for storage mode (57).

Figure 6:
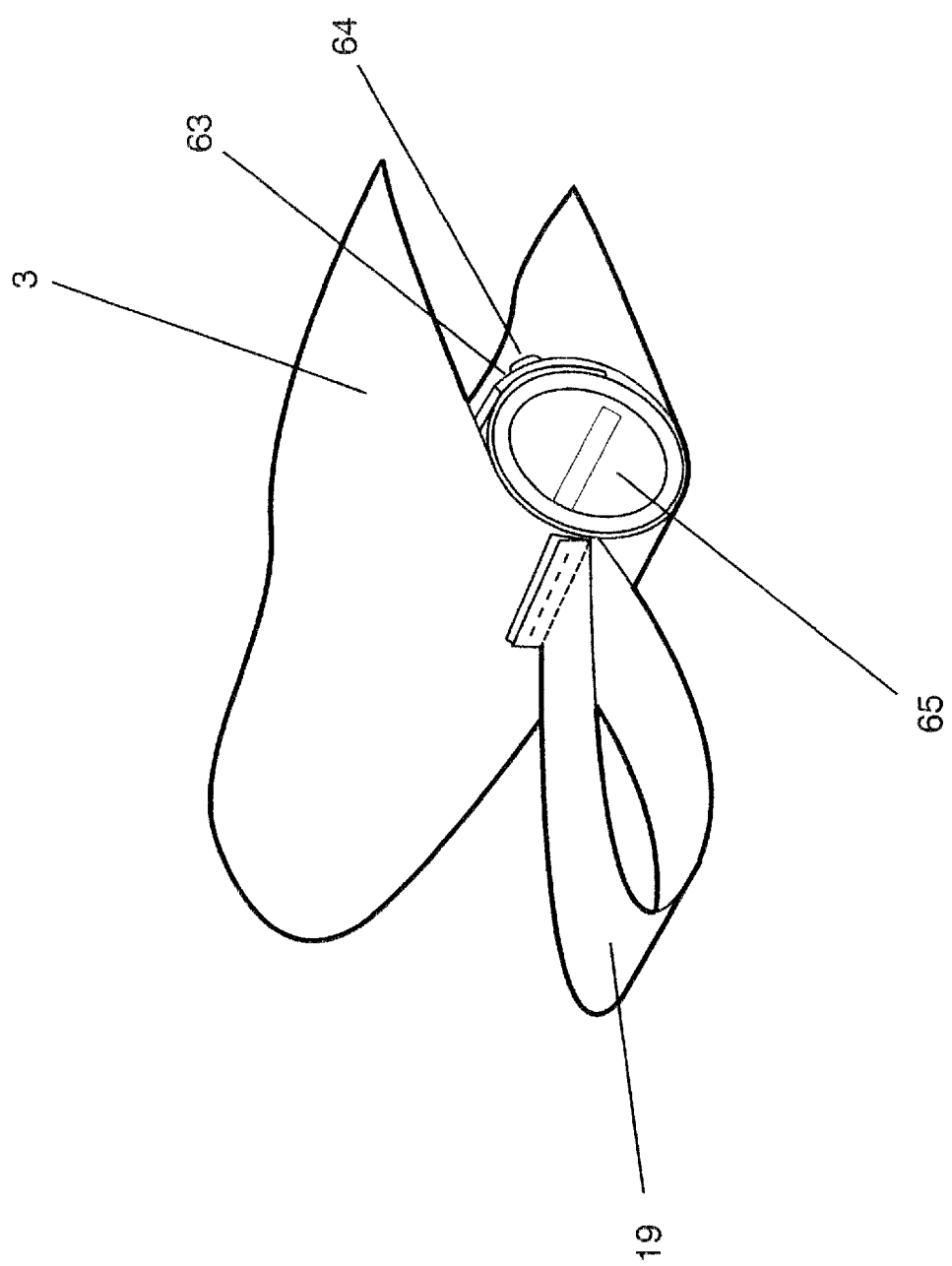
FIG. 6 is a partial perspective view of a fabric loop tie-down according to the present invention.

Referring to FIG. 6, a partial perspective view of a fabric loop tie-down is shown. The tie-down is used to provide a means for securing the kayak to a vehicle or rack for transport. The tie-down (19) is sewn to the kayak skin (3) and a strap (63) on the inside surface of the skin. Snaps (64), preferably, Velcro, or tie-down straps, are used to secure the strap around the frame tube (65).

Figure 7A:
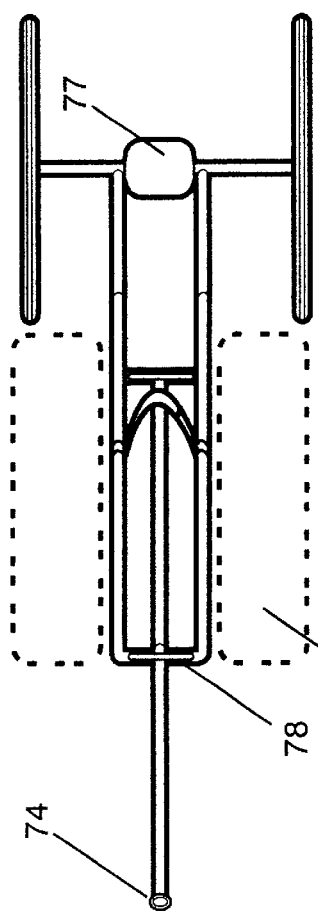
FIG. 7 shows plan and side views of a bicycle cart for transporting the invented boat.
Figure 7B:
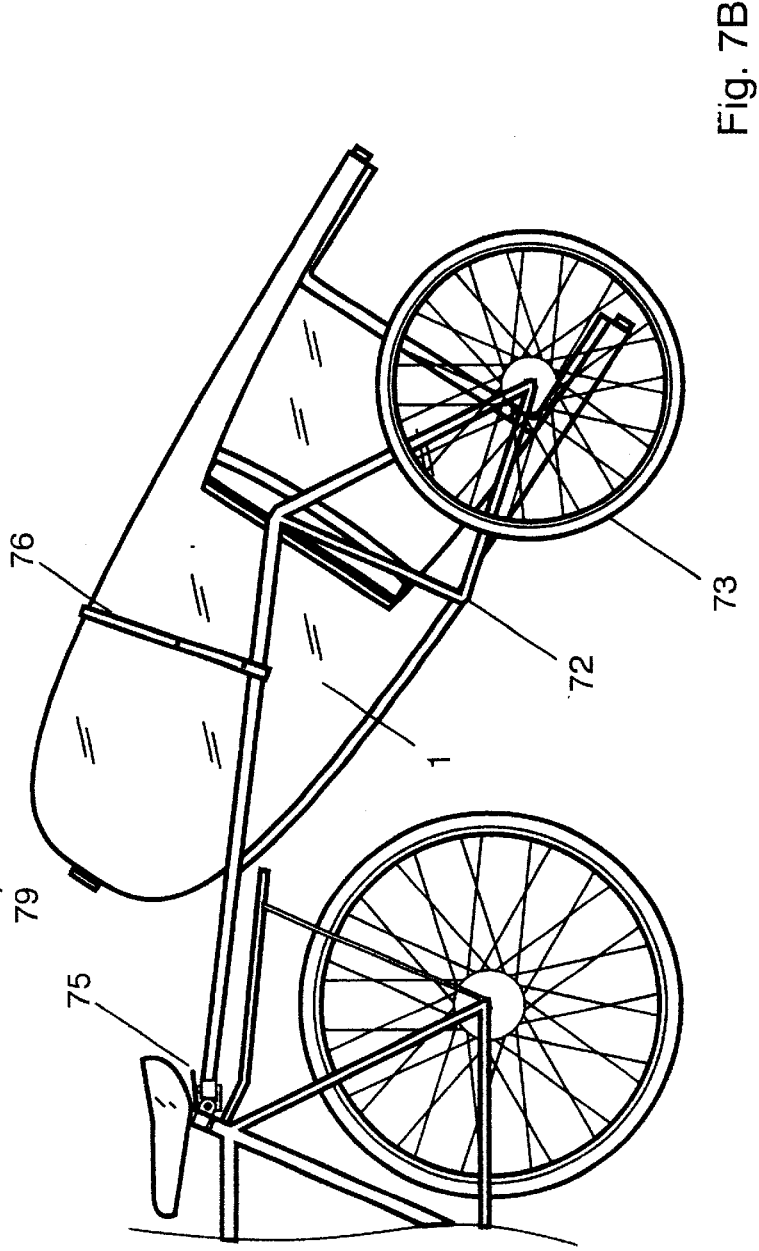

Referring to FIG. 7, plan and side views of a bicycle cart for the invented boat are provided. A partial bicycle and a folded kayak are included in the side view. The folded kayak (1) rests inside a rigid frame (72) that supports the kayak on both sides and along the bottom edge. The lower portion of the kayak nests around the cart's axle. Wheels (73) are attached at either end of the axle. A sleeve (74) at the front of the cart slips over a vertically mounted post that is connected to the bicycle seat post. A flexible strip (75) keeps the sleeve on the post during transport. Pads (77, 78) absorb shock and vibration. With alternate modification, additional kayaks or storage compartments can be attached on either side of the frame (79).

Referring to FIG. 8, a hard travel case suitable for air shipment of the invented boat is illustrated. The case (81) is made of metal or a composite material, includes a handle (83), and contains a foam insert (82) form fitted around the folded kayak (1).

Figure 9:
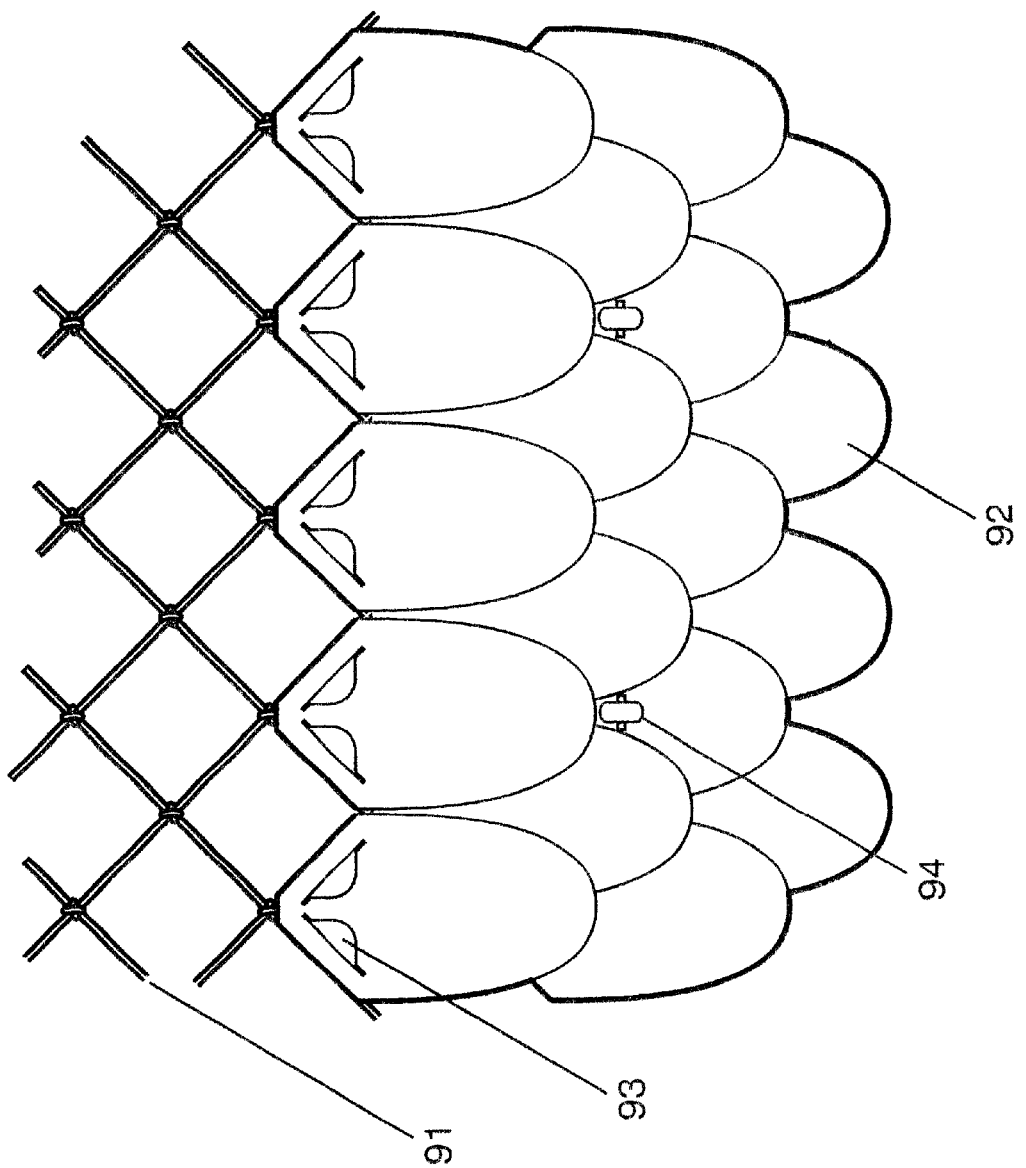
FIG. 9 shows the structure of an embodiment of protective mesh skin of the invented boat.

Referring to FIG. 9, a protective mesh is preferably used over a majority of the boat to resist tears and abrasion. The mesh is comprised of fabric netting (91) with scales (92) attached along two lengths of each rectangular opening. Flaps (93) on each scale wrap around the netting (91), tuck in slots on the scale (92), and are heat staked in position if necessary. Selective scales incorporate beads (94) that spin to provide additional wear resistance.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A collapsible boat comprising:
  a) a folding integrated frame comprising:
    i) a primary frame, divided into a plurality of sections, forming a top profile of the boat;
    ii) a plurality of cross ribs pivotally attached to the primary frame, and
    iii) a plurality of latching hinges between the sections of the primary frame, such that the integrated frame unfolds and latches to transition from a folded configuration to a rigid three-dimensional frame;
  b) a substantially waterproof outer skin for covering the integrated frame; and
  c) a fastener attached to the skin, for tightening the skin around the integrated frame such that, when the frame is in the rigid configuration, the skin covers a bottom of the integrated frame, sides of the integrated frame, and a portion of a top of the integrated frame formed by the primary frame, while leaving room for a person to enter the boat from above.

2. The boat of claim 1 wherein the integrated frame further comprises:

a) a first substantially C-shaped arc having a first end and a second end, and a second substantially C-shaped arc having a first end and a second end, wherein, when the integrated frame is in the rigid configuration, the arcs are positioned opposite each other in the same plane with the first end of the first arc adjacent to the first end of the second arc, and the second end of the first arc adjacent to the second end of the second arc, and wherein each arc has a first arc-post and a second arc-post, each located near, respectively, the arc's first end and second end, and each arc-post protruding horizontally away from the center of the boat in its rigid configuration;

b) a substantially U-shaped central cross rib having a first end and a second end;

c) a first and second substantially T-shaped brace movably connecting the central cross rib's first and second ends with, respectively, the first and second ends of the arc, and comprising a T-brace-post protruding horizontally away from the boat in its rigid configuration;

d) four cross-braces, wherein each cross brace is pivotally and slideably affixed to a different arc-post, wherein each cross brace pivots and then slides to connect the post to which it is affixed with the T-brace-post of the nearest T-brace and the arc-post of the nearest end of the opposing arc;

e) a keel section connected to the arcs at either end of the boat at the middle of each arc;

f) a first peripheral cross rib connected to the first arc by a cross rod positioned in the same plane as the first arc and substantially parallel to a straight line between the first arc's first and second ends, and a second peripheral cross rib connected to the second arc by a cross rod positioned in the same plane as the second arc, and substantially parallel to a straight line between the second arc's first and second ends; and g) at least two sleeves for holding the first and second arcs in one plane when the boat is in its rigid configuration.

3. The boat of claim 2 wherein the frame further comprises at least two keel sections disposed opposite each other and held together in the rigid configuration by a keel lock plate with cam shaped slots.

4. The boat of claim 3 further comprising a handle, connected to the cam lock plate, located above the bottom of the central cross rib and connected to the keel lock plate by a rod that proceeds downward through the bottom of the central cross rib, such that when the handle is turned it causes the keel lock plate to rotate such that the cam shaped slots attain a position in which the keel lock plate can be separated from the keel sections.

5. The boat of claim 2, in which the frame further comprises a hinged floor pan.

6. The boat of claim 5 wherein the hinged floor pan comprises a first half, a second half and at least one hinge connecting the first half to the second half, the first half is connected to a bottom of the central cross rib and to a bottom of the first peripheral cross rib, and the second half is connected to the bottom of the central cross rib and to a bottom of the second peripheral cross rib.

7. The boat of claim 1, further comprising a seat fastened to the frame.

8. The boat of claim 1, in which the fastener is selected from the group comprising, zippers, a drawstring, and laces.

* * * * *